United States Patent [19]

Skogward et al.

[11] Patent Number: 5,285,034

[45] Date of Patent: Feb. 8, 1994

[54] GEARSHIFT LEVER SWITCH

[75] Inventors: Kenneth Skogward, Huskvarna; Jan Stenevi, Mullsjö, both of Sweden

[73] Assignee: Scandmec Mecania AB, Sweden

[21] Appl. No.: 835,921

[22] PCT Filed: Aug. 24, 1990

[86] PCT No.: PCT/SE90/00544

§ 371 Date: Mar. 27, 1992

§ 102(e) Date: Mar. 27, 1992

[87] PCT Pub. No.: WO91/02912

PCT Pub. Date: Mar. 7, 1991

[30] Foreign Application Priority Data

Aug. 25, 1989 [SE] Sweden ............................ 8902828
Nov. 6, 1989 [SE] Sweden ............................ 8903702

[51] Int. Cl.⁵ ............................................. H01H 9/06
[52] U.S. Cl. ............................ 200/61.88; 200/61.54
[58] Field of Search .............. 200/61.27, 61.54, 61.85, 200/61.88, 61.89; 192/3.56, 3.58

[56] References Cited

U.S. PATENT DOCUMENTS

| | | | |
|---|---|---|---|
| 2,732,447 | 1/1956 | Findley | 200/61.54 |
| 2,813,942 | 11/1957 | Binder | 200/61.54 |
| 2,945,100 | 7/1960 | Maurice et al. | 200/61.88 |
| 3,268,680 | 8/1966 | Anderson | 200/61.88 |
| 3,910,388 | 10/1975 | Moori et al. | 192/3.56 |
| 4,144,424 | 3/1979 | Takeda et al. | 200/61.88 |
| 4,158,404 | 6/1979 | Yamashita et al. | 192/3.58 |
| 4,183,424 | 1/1980 | Rumyantsev et al. | 192/3.58 |

FOREIGN PATENT DOCUMENTS

| | | |
|---|---|---|
| 2162457 | 7/1973 | Fed. Rep. of Germany . |
| 2740750 | 3/1978 | Fed. Rep. of Germany . |
| 2347227 | 11/1977 | France . |

Primary Examiner—J. R. Scott

[57] ABSTRACT

A lever has a knob and an elongated part. In one of its ends, the elongated part carries the knob and is at a distance from the end connected to a mechanism that is to be operated, such as a gear box. The knob includes an electrical switch and is movable radially relative to the longitudinal axis of the lever part and has a cavity into which the lever part protrudes with one of its ends which also functions as a second contact element. The cavity has a peripheral surface which defines a space with the surface of the end of the lever part. In the space there is located an elastically deformable, ring-shaped centering element which at its outer periphery abuts against the peripheral surface of the space and at its inner periphery abuts against the surface of the lever part and a ring-shaped, electrical contact element. The contact element, which is part of the switch, is immovably connected to the knob and adapted to follow the knob in its radial movements. The centering element strives at centering the contact element relative to the end part of the lever part. In a neutral position for the knob, the movable contact element defines a space with the end part of the lever part. By a manual sidewards movement of the knob relative to the lever part, the ring-shaped contact element will be moved into an eccentric position and into contact with the second contact element.

14 Claims, 5 Drawing Sheets

GEARSHIFT LEVER SWITCH

BACKGROUND OF THE INVENTION

The present invention relates to a control lever having a knob and an elongated lever part which at its one end carries the knob and at some distance from said end is connected to a mechanism that is to be operated, the knob having an electrical switch.

More particularly, the present invention relates to that type of control lever which has a knob in which an electrical switch has been arranged, which can be actuated manually for changing between different positions of the switch. It is also known to arrange electrical switches in levers, for example a pushing switch which is actuated by hand for switching, for instance, an overdrive gear attached to a lever. For the operation of airplanes it is further known to arrange different types of switches in joy sticks.

U.S. Pat. No. 4,183,424 discloses a gear change lever having an elastically mounted knob. The knob includes a spring element positioned below the contact elements. The spring element is an elastic centering element which requires a very symmetrically manufactured knob and a portion of the lever in order to maintain a clearance between the contact elements in a non-activated position. In practice, the clearance must be disadvantageously large in order to secure a clearance, resulting in delayed contact function. For actuation of a clutch by means of a contact function in the knob of a gear change lever, it is of utmost importance that the activation takes place with a minimum delay after moving the knob for changing gear.

The object of the present invention is to obtain a lever by which a change of electrical condition of the electric switch is obtained automatically as early as possible during an operation.

SUMMARY OF THE INVENTION

The object of the invention is obtained by means of a lever according to the invention which is characterized in that the knob is somewhat movable in different directions radially relative to the shaft of the lever and includes a cavity into which the lever part protrudes with one of its end parts and that said cavity has a peripheral surface which defines a distance to the surface of said end part of the lever, that in said space an elastic, ring-shaped centering element is located which by means of one of its peripheries abuts against said peripheral surface of the space and with its second periphery abuts against said end part of the lever, and at least one ring-shaped movable, electrical contact element included in the switch which is connected to the knob and adapted to follow it in its radial movements, that said centering element strives at centering said contact element relative to said end part of the lever so that in a neutral position of the knob the movable contact element has a distance to said end part of the lever, which end part forms one contact element rigidly fastened in the knob, said contact element being part of the switch and that by a manual transverse movement of the knob relative to the lever in some of said different directions, the ring-shaped contact element is moved radially to one or more different contact positions in contact with the second contact element.

BRIEF DESCRIPTION OF THE DRAWINGS

The invention shall be explained in detail below in connection with some embodiment examples with reference to the attached drawings, in which.

DETAILED DESCRIPTION OF THE INVENTION

Figure 1:
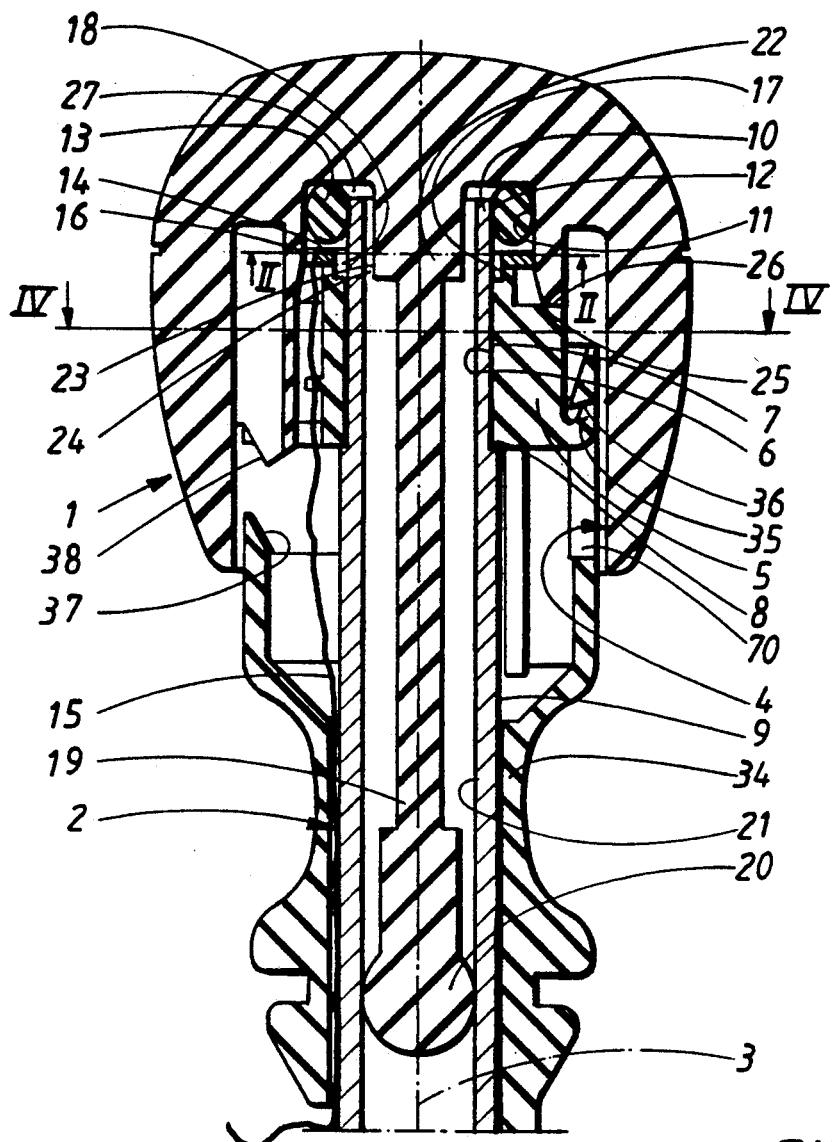
FIG. 1 is a central, axial section through the lever according to the invention in a first embodiment example along the line I—I in FIG. 4.

The lever according to the invention is intended to bring about a mechanical change of a mechanism as well as an electric activation of a means which either is a part of said mechanism or is completely separated from this in one and the same movement of the lever. The lever in the examples shown is particularly suitable to be used as a lever for changing between different gear positions by manual operation. The lever consists, as appears from FIG. 1, substantially of a knob 1 and a substantially elongated lever part 2, of which only the upper part is shown in the drawings. The lever part 2 carries at its upper end the knob 1 and is at its lower end coupled to the mechanism that is to be operated or transfer the operation movement, which is a swinging movement. The movement of the knob will then substantially occur to the sides, that means transversally to the length axis 3 of the lever part. The lever part 2 consists of a cylindrically shaped pipe which is inserted in a cavity 4 in the knob 1, having its opening turned downwardly. A bushing 5 is mounted on the lever part. It has been made from an electrically insulating material, for example relatively shape-stable plastics. The bushing has through-going holes, with an inwardly turned cylindrical surface 6, which with good fit is connected to a corresponding outwardly turned cylindrical surface 7 of a part of the lever part 2 so that the bushing is rigidly connected to the lever part 2. The cylindrical surface 7 ends via a step 8 to the below located surface of the lever, which has a greater diameter. Hereby, a stop for the bushing 5 is obtained which consequently can not be pushed further downwardly. The bushing is so located that above the bushing an end part 10 of the lever protrudes, which in the example shown has a further reduced diameter in relation to the part 7 of the surface of the lever part. The end part 10 protrudes into an inner cylinder-shaped part of said cavity 4 in the knob 1, having an inward, cylindrical surface 11 which makes a ring-shaped cavity with the outwardly, turned surface 12 on the end part 10. In this ring-spaced cavity an elastically centering element 13 of a highly elastic material, such as silicon in the shape of an O-ring, has been pushed in, which, by means of its inner periphery, abuts against the surface 12 of the end part 10 of the lever part and, by means of its outer periphery, abuts against the cylindrical surface 11 in the knob 1.

In the ring-shaped cavity in the knob, and more particularly in the same cylindrical part in which the centering element 13 is located, a ring-shaped electrical contact element 14 has been arranged. It is made from an electrically conducting material, such as metal. This contact element 14 is a part of an electrical switch in the lever, i.e. in the knob 1, where the ring-shaped contact element 14 represents a movable contact element. The end part 10, by way of its cylindrical surface 12, forms the second stationary contact element of the switch. In the switch the lever part 2 as a whole forms the connecting lead to the stationary contact element through the fact that the lever is electrically conducting or at least made with an electrically conducting layer. A connecting lead through a closed circuit through the switch can thereby be connected anywhere and most suitably below the knob 1.

A suitably insulated connecting lead 15 is shown in FIG. 1 and is by one of its ends connected to the movable contact element 14 and by means of its second end to an electrical circuit for an electrically operating function. As an example of such a function, electrical operation of a clutch can be mentioned, whereby manual clutching on a motor vehicle can be eliminated while still maintaining a traditional manual gear box. The movable contact element 14 is particularly attached by its outer periphery 16 through the inwardly turned surface 11 and has consequently the same diameter as the inwardly turned surface 11 so that it can be rigidly secured to the knob 1 with a good fit.

Figure 2:
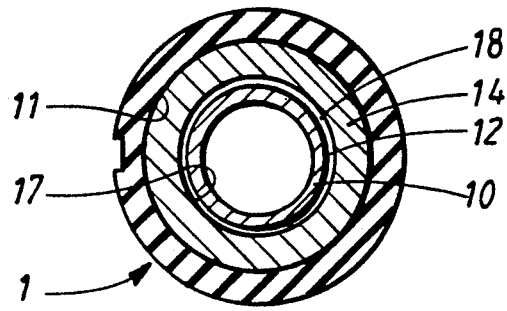
FIG. 2 is a radial section through the device along the line II—II in FIG. 1.

In the first embodiment of the lever shown in FIGS. 1–5, the movable contact element 14 consists of one single uninterrupted electrically leading ring with the shape of a simple washer. The inner periphery 17 of the ring-shaped contact element 14 which, as its outer periphery, is cylinder-shaped or at least has a circular contour line, has on the contrary a clearly greater diameter than the diameter of the surface of the end part 10 of the lever part, as shown in FIG. 2. In FIGS. 1 and 2 the knob 1 is shown in a neutral position with respect to the lever whereby a neutral position of the switch is obtained the movable contact element 14 is coaxial with the stationary contact element, that is the end part 10 of the lever part 2. In the neutral position there will thereby exist around the end part 102, ring-shaped contact space 18 which, in the first embodiment has the same width along the whole distance, that is, is rotationally symmetrical. The switch is then, consequently, open. The contact space 18 shall be sufficiently large to prevent contact in this neutral position and large enough so that vibrations in the lever shall not lead to unintentional contact between the contact parts in the switch but shall nevertheless be as small as possible to bring about a quick and early contact function at operation movements, which will be better understood below.

The knob 1 is well centered in its neutral position and guided in relation to the lever part 2 but nevertheless somewhat movable to the sides, that is transversally to the length axis 3 of the lever part, and accordingly substantially radially through the connection of the lever with the lever part 2 via the centering element 13 and the bushing 5. Further, the knob includes a central shaft 19 with a hinge ball 20 at its lower end. The shaft and the hinge ball are inserted in the cylindrical, elongated space 21 in the lever part 2. The hinge ball 20 has such a diameter and such a fit in the cylindrical space 21 that the hinge ball 20 allows a small swinging movement of the shaft 19 having the hinge ball 20 as a lead centre. This ball has a somewhat resistant influence on the knob 1 through friction against the inwardly turned wall of the lever part in the space 21. The shaft has at its upper end a somewhat enlarged part 22, with a surface 23 which maintains a ring-shaped space 24, the radial distance of which somewhat supersedes the radial distance of the contact space 18.

Further the inwardly turned surface 11 of the knob, a distance below the movable contact element, continues in a downwardly turned somewhat oblique step 25, which has such an angle that it coincides substantially with the direction of a circle arc having the hinge ball 20 as a centre. A corresponding upwardly turned step-like supporting surface has been made in the bushing 5 and these two step surfaces 25,26 form sliding and supporting surfaces so that the knob 1 stops against the bushing 5 and is allowed to make this desired small radial movement to the sides of the knob. A space 27 between the upwardly turned end surface of the lever part and the downwardly turned end surface of the space in the knob can be maintained so that the friction at the movement of the knob relative to the lever part is kept small in spite of the load exerted by the hand of the operating person on the knob 1.

Figure 3:
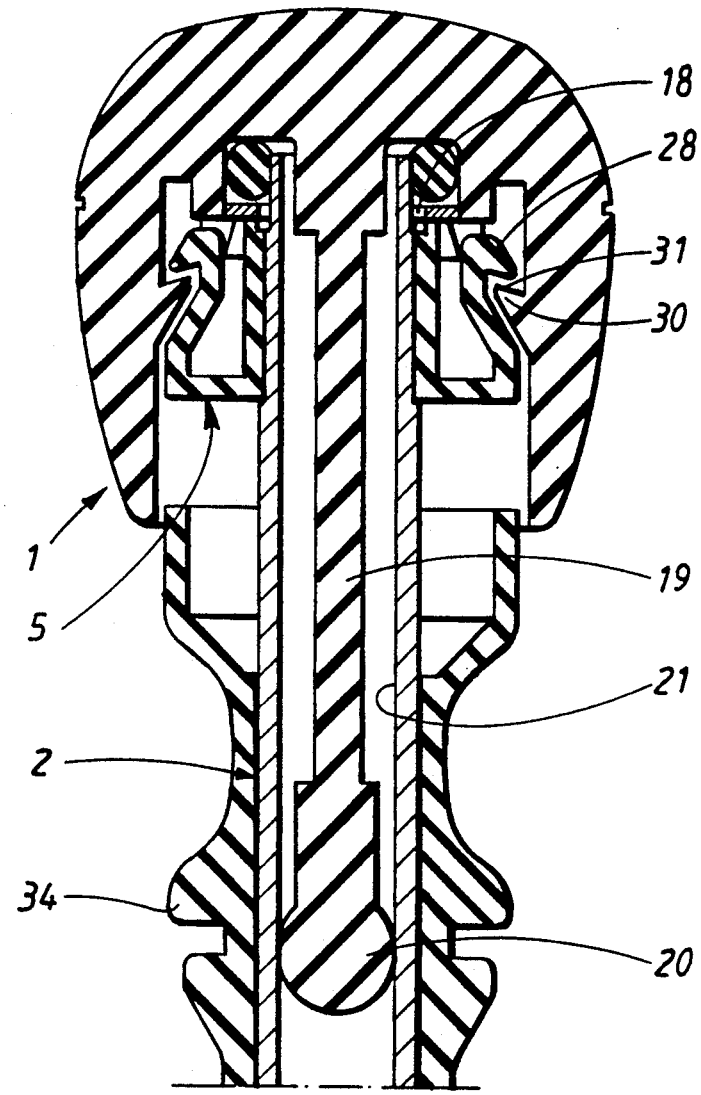
FIG. 3 is a central, axial section through the device along the line III—III in FIG. 4.
Figure 4:
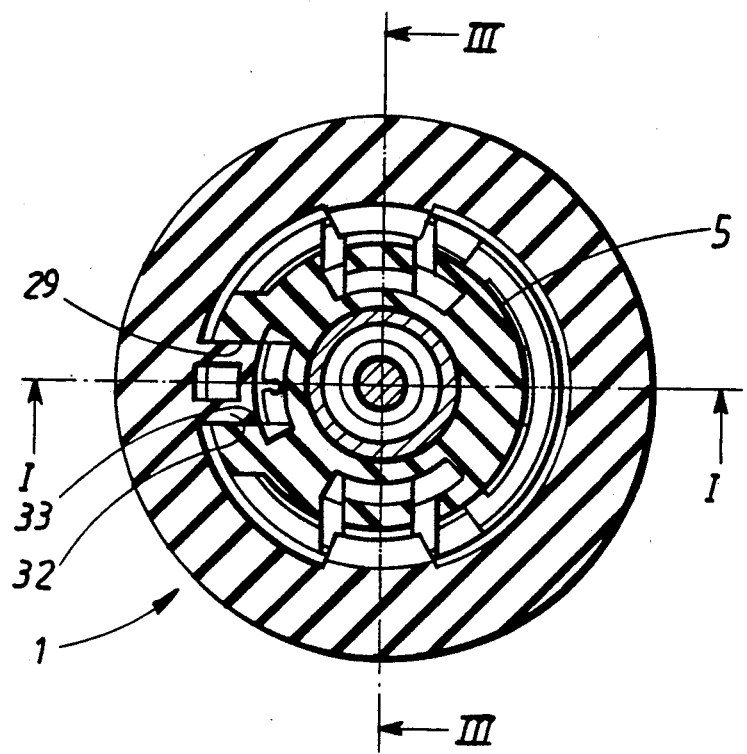
FIG. 4 is a radial section through the device along the line IV—IV in FIG. 1.
Figure 5:
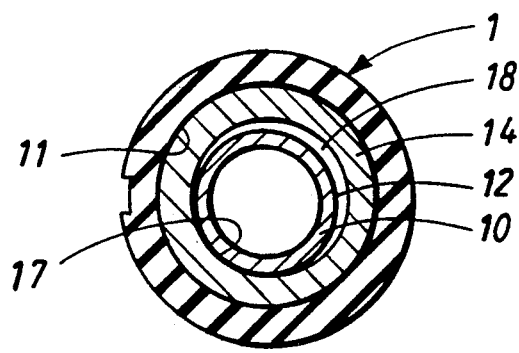
FIG. 5 is a section, corresponding to the one in FIG. 2 but with the device in an activated position.

FIGS. 3 and 4 show a special shape of the bushing which constitutes a snap by means of two snapping organs 28 to maintain axially the knob 1 against being lifting off from the lever part 2. Also shown is a recess 29 to form a turning locker for the knob 1 so that it can not freely be turned around the lever part 2. Without disturbing the prime functions of the knob, some turning can be allowed per se, but a better operating feeling is obtained if the knob is locked against turning. Further, the knob can on its upper surface have symbols, for instance gear positions, which should be used for a predetermined angular position. The snapping organs 28 are elastically deflectable radially inwardly which makes it possible to have a simple mounting of the knob 1 by simply putting it on the end part 10 of the lever part 2. The snapping organs 28 will then, through cooperation with the inwardly protruding hook-formed parts 30 of the knob, be pushed aside and will go back elastically, by cooperation between stops 31 on the hook-shaped parts, to prevent lifting off of the knob 1. The turn-locking is obtained through making the knob 1 with a radially inwardly protruding organ 32, which has stopping surfaces 33, which are so located that they practically ensure turn-locking by cooperation with corresponding surfaces in the recesses 29. Radial movements, however, of the knob are allowed with low friction.

A further operating possibility exists with the embodiment shown in the figures, namely by means of an axially movable sleeve 34, which is adapted to be displaced having the lever part 2 as a guide by gripping it between two of the fingers and having it lifted in an upper end position when operating the lever part with knob 1. This sleeve 34 is usually used to release a barrier against unintentional introduction of a reverse gear. The sleeve 34 is normally held in a lower end position, as shown in FIG. 1, by means of a spring not shown. The lower end position is made by a notch 35 in the sleeve, which is brought to abut against a stopping surface 36 in a groove 70 in the sleeve 34. It is, however, possible by the upward displacement of the sleeve to bring about the radial displacement of the knob 1 to change the switch in the knob to a closed position. This is obtained by the oblique guiding surface 37 of the sleeve, which by cooperation with a correspondingly oblique guiding surface 38 in the knob brings about this radial displacement.

The function of the lever with relation to activating the switch which should be evident from the above description of the construction of the lever, is described as follows. Operating the lever always occurs by means of the knob 1, which is gripped by the hand of the operator and displaced sidewards to a pre-elected activating position, for instance a gear position. The lever part 2 is, however, mounted in a mechanism that provides a resistance which supersedes the resistance of the centering ring 13 in the knob when striving at centering the knob relative to the lever part 2. In the position shown in FIGS. 1-4, the knob has a central, neutral position and by a radially directed hand movement of the knob 1 in any direction, the centering element 13 will be compressed at that side where the force is put, whereby the knob is allowed to be moved sidewards to an eccentric position relative to the lever part 2 and more specifically its longitudinal axis 3. By a very small displacement, contact will arise between the contact element 14, which is movable by the knob, and the stationary contact element, that is the end part 10 of the lever part, and, more specifically, its surface 12. Such an activated position is shown by means of an example in FIG. 5, which has been accomplished after moving the knob 1 in a direction obliquely upwards to the right. Thereby, the switch will be closed and the circuit connected to it, which in this case will give rise to a disengagement of a clutch before gearing occurs.

As soon as the grip around the knob 1 ceases, the knob will return to its centre position through the action of the centering element 13 and resume its initial position and hence create a force against the wall 11. The centering element 13 is located inside this wall and the contact element will again be centered and the contact space 18 will be maintained around its whole circumference so that the switch will be open and the clutch function again will be resumed when the gear position has been obtained. By having the centering element 13 as well as the contact ring 14 in the same space between the end part of the lever part 2 and the inwardly turned surface 11 of the knob, it is assured that the contact ring 14 continually centred independently of possible deviations due to tolerances during manufacture. It is evident that the parts besides the contact elements themselves are of electrically insulating material so that no other circuit is closed in any other way. The knob is made from a relatively strong, durable shape-stable plastic which is easy to grip and that can be somewhat deformable in the surface, whereas the bushing 5 may be made from a somewhat harder material, such as curable plastics. Also the sleeve 34 may be made from a plastic material.

Figure 7:
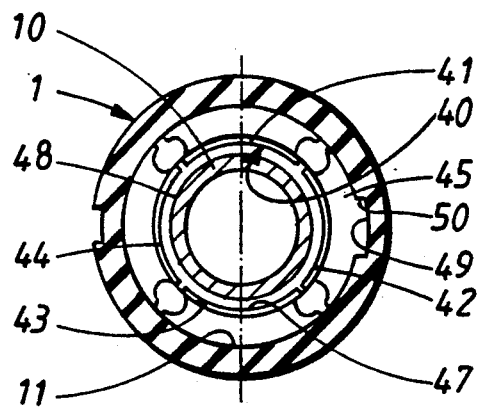
FIG. 7 is a section along the line VII—VII in FIG. 6.
Figure 6:
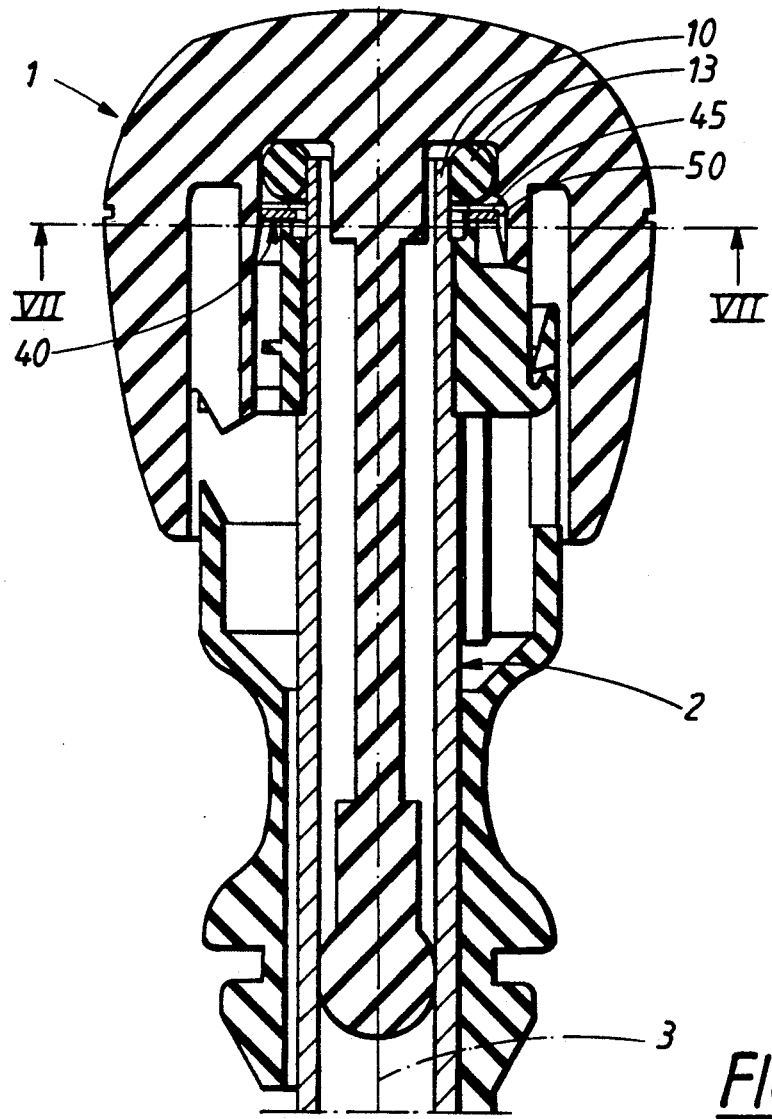
FIG. 6 is a section, corresponding to the section in FIG. 1 through the lever in a second embodiment example.

The lever according to the second embodiment shown in FIGS. 6 and 7 coincides with the first embodiment with the exception of the construction of the movable contact element. This contact element 40, also consists of a substantially ring-shaped in two or more conducting sections (shown in the example as four conducting sections 41-44) which are electrically conducting sections 41-44, which here are electrically insulated from each other by being arranged with spaces 63 between each other. The conducting sections 41-44 can, by means of their own individual electrical connection, each be a part of a separate circuit. Through the smaller, outer diameter 48 in the surface of the stationary contact element 10, which in this example also is the contact surface, the contact point in the knob 1 which is moved to an eccentric position will also in this case be a point contact seen in the section according to FIG. 7 so that in principle contact is obtained with only one contact sector each time. This means, accordingly, that a predetermined circuit will be closed dependent on the direction of the radial movement to an eccentric position of the knob 1. With this division of the movable contact element a switch with more positions is, consequently, obtained in which one of the contact parts is common and connectable to one or more other contact parts. Different electrical functions can then be switched on dependent on the moving direction of the knob. When it is used as a gear lever, an electrically driven clutch can for instance be activated having variable time delay depending on which gear that shall be used, which means in which direction the knob is moved and, accordingly, what contact is activated.

The section divided element 40 according to FIGS. 6 and 7 is principally mounted in the same way as the contact element according to the first embodiment, that is maintained in p means of an inwardly directed substantially rotationally symmetrical surface, which continually has a stationary reference to the inwardly turned rotation symmetrical surface that holds the centering element 13 in position, which means in the examples shown the inwardly turned cylindrical surface 11, which is a common position maintaining guiding surface for both the centering element 13 and the contact element 40. In the embodiment according to FIGS. 6 and 7, the contact element 40 has also been provided with a ring-shaped holder 45 of an electrically insulating material in which the contact sections 41,42 are partly moulded in so that their inner periphery 47, that is their circular arc-shaped contact surface, can be brought into electrical contact with the contact surface 48 of the second contact element 10, which is the surface of the upper part of the lever part. The holder 45 is also mounted stationary against turning in the knob 1 so that the contact sections maintain a predetermined angle interval around the longitudinal axis 3 of the lever. In this second embodiment the cylindrical guiding surface 11 is provided with a recess 49 into which the holder 45 protrudes by way of a corresponding protrusion 50. When operating by means of the lever according to FIGS. 6 and 7 from its neutral position such that contact section 41-44 will be connected, the knob is moved radially to an eccentric position towards the stationary contact part. In this example the contact functions have been divided in four equally large angle sectors of circa 90°, whereas the sector borders are decided by the positions of the spaces 63.

Figure 9:
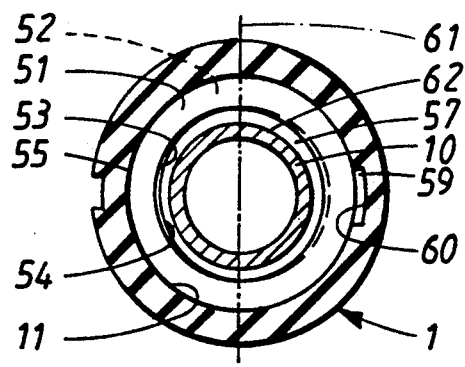
FIG. 9 is a section along the line IX—IX in FIG. 8.
Figure 8:
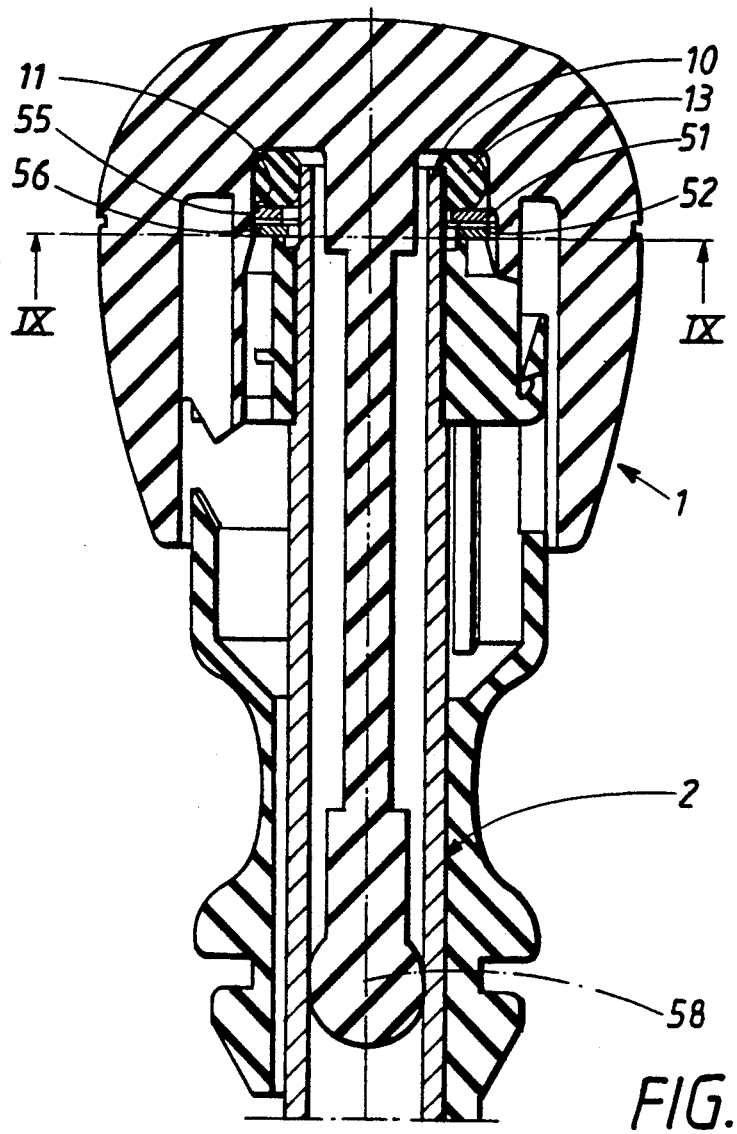
FIG. 8 is a section, corresponding to the section in FIG. 6 through the lever in a third embodiment example.

The third embodiment of the lever which is shown in FIGS. 8 and 9, is an alternative to the second embodiment according to FIGS. 6 and 7 but gives in principal the same electrical function; namely, closing of different electrical circuits in dependence of the direction of the movement of the lever. In this third embodiment only two contact positions have been chosen for a closed circuit but even this solution can be adapted to more contact functions if wanted. In this third embodiment there is instead of a division of the ring-shaped contact element's periphery, a division of the contact element in element sections which are located at different levels along the upper part of the lever part 2. One can say that the contact element is sectioned in sections lying in different radial planes around said upper part, which represents the stationary contact element. In practice, the movable, ring-shaped contact element has been complemented by a further movable ring-shaped contact element for each contact position wanted. In the example shown, two contact positions are wanted where the switch is closed and hence two contact elements 51,52 represent the movable part of the switch together with the knob 1. To achieve a sector division of the contact surface of the movable contact elements 51,52 similarly to embodiment according to FIGS. 6 and 7, the elements 51, 52 been arranged on different levels along the upper part of the lever part and also have been shaped with mutually, radially somewhat displaced inner peripheries 53,54. That means that they have mutually displaced arc centres whereby the inner peripheries over only a part of its circumference makes the actual contact surface of the switch. In the example shown, the contact elements 51,52 have been so formed that their outer peripheries 55,56 are concentric and, as in the examples above, maintained in position by the inwardly turned cylindrical guiding surface 11 in the knob 1. Between this guiding surface and the end part 10 of the lever part 2 is the elastic, centering element 13, located with regard to the height level between the movable contact element 1 of the switch and the end surface of the rotation symmetrical space, which is delimited inter alia by the guiding surface 11. The differences in centricity of the two contact elements 51,52 is in this example obtained simply by having these shaped with separate circular holes, which are mutually displaced with regard to their arc centres. To be able to maintain a substantially symmetrical contact space 57 in the neutral position shown in FIG. 9 with the switch open, both contact elements 51 and 52 are in the example shown symmetrically eccentric relative to the common longitudinal axis 58 of the knob 1 and the lever part 2. The arc centres of the two inner peripheries 53,54 are preferably diametrically oppositely positioned at each side of said longitudinal axis 58 and located at equally large distances therefrom. To assure a predetermined angle interval of the contact functions, the contact elements 51,52 have been locked in a chosen turning position relative to the longitudinal axis 58. This has been solved in the example shown by providing them with a protrusion 59 which protrudes into a corresponding recess 60 in the knob 1.

As appears from FIGS. 8 and 9 the eccentricity of the inner peripheries 53, 54 of the contact elements 51,52 will cause a result in that above a certain angle interval, in the example shown as 180°, that is, in the section to the right of the symmetry line 61, one contact element 51, in the example shown the upper contact element, will protrude and lie closer to the stationary contact surface of the stationary contact element, that is, its periphery 62. As both of the inner peripheries 53,54 are circular the lower contact element will in a corresponding way with its inner periphery protrude and be located closer to the stationary contact element than the inner periphery of the upper contact element at a position greater than 180° of the total periphery, which is in the section to the left of the symmetry line 61.

When operating by means of the lever according to FIGS. 8 and 9 from the neutral position and in a direction towards the right-hand sector with respect to the symmetry line 61 the knob will be moved radially so that contact between the stationary contact element 10 and the lower contact element 52 is obtained by means of the left half of the inner periphery 45 whereby the switch and its connected electrical circuit is closed for actuating an electrically driven device activating an indication means or the like.

The invention is not limited to the above described embodiments which are also shown in the drawings, but can be varied in a number of different ways within the scope of the subsequent claims. For example it is contemplated that the centering element 13 is located between the upper part 22 of the shaft and the inner wall of the lever part 2. The contact ring 14 can then be maintained outside, but it can also as an alternative be arranged around the upper part of the shaft 19 so that the inwardly turned surface 21 of the lever part 2 makes a contact surface for cooperation with the movable contact element 14. Instead of eccentrically displacing the inner periphery of the contact element as according to FIGS. 8 and 9, the contact elements can alternatively be given different arc radii over different sectors of their inner periphery. By the expression "stationary contact element" it is meant that this element in the switch has been stationarily arranged in the lever part, whereas "the movable contact element" is movable together with the knob. The expression "contact surface" relates to the active surface of each contact element by which contact can be obtained between the movable and the stationary contact element.

What is claimed is:

1. A control lever comprising an elongated lever part extending along a longitudinal axis and a knob at one end thereof, with the other end of the lever part being connected to a mechanism that is to be operated, the knob being movable in different directions radially relative to said longitudinal axis and including a cavity presenting defined by an inner peripheral surface of the knob which surrounds an end part of said lever part with a radial clearance therebetween, the knob housing an electrical switch which comprises at least one ring-shaped movable electrical contact element affixed to the knob so that the movable contact element moves with the knob, housing therein an elastic ring-shaped centering element, the outer periphery of the centering element abutting against said peripheral surface of the knob and the inner periphery of the centering element abutting against said end part of the lever part, the centering element acting to center the movable contact element relative to the end part of the lever part so that in a neutral position for the knob there is an annular space between the movable contact element and said end part of the lever part, which end part comprises a stationary contact element, and that by manual radial movement of the knob relative to the longitudinal axis in any of said different directions, the movable contact element is displaced radially to one of several contact positions in contact with the stationary contact element.

2. The lever according to claim 1, wherein said ring-shaped movable contact element has an unbroken contact surface in the shape of a closed periphery, which extends along said end part of the lever part such that during operation of the knob, a predetermined electrical circuit is closed independent of the chosen contact position.

3. The lever according to claim 1, wherein said movable contact element is arranged sectionwise to be brought into contact with the stationary contact element so that different contact functions may be obtained in different directions.

4. The lever according to claim 3, wherein the movable contact element is so divided that it consists of two or more sections electrically insulated from each other, each section having its own contact surface which occupies a predetermined sector around the longitudinal axis of the knob.

5. The lever according to claim 3, wherein the movable contact element is so divided that it consists of two or more closed ring elements extending around the stationary contact element, the contact surface for each one of the ring elements extending over one or more predetermined sectors around the longitudinal axis of the lever.

6. The lever according to claim 5, wherein the contact surface for each of the closed ring elements comprises a part of the inner periphery thereof and that said inner peripheries are circular arc with mutually displaced centers.

7. The lever according to claim 1, wherein said peripheral surface of the knob defining the cavity comprises an inwardly turned envelope surface, which is a supporting surface for both the centering element and the ring-shaped movable contact element.

8. The lever according to claim 1, wherein the lever part is a pipe and includes a central shaft connected to the knob and having a hinging ball arranged to be a hinging pivot for the radial movements of the knob.

9. The lever according to claim 1, wherein an axially, stationary bushing made from an electrically insulating material is mounted on the lever part and included in the cavity of the knob and has supporting sliding surfaces which extend transversally to the longitudinal axis of the lever part and on which the knob is carried by means of corresponding supporting and sliding surfaces on the knob so that a space is maintained between the end part of the lever part in the space and surfaces in the space turned towards the end surface.

10. The lever according to claim 1, wherein the knob and the bushing include cooperating snapping organs, which are snap-lockable for mounting of the knob by allowing downward axial installation of the knob on the lever part such that said support and sliding surfaces abut each other, but which lock against axial movements of the knob in the upward axial direction.

11. The lever according to claim 1, further comprising an axially movable sleeve which is adapted to be displaced along the lever part, wherein the sleeve includes guiding organs for cooperation with guiding organs in the knob adapted which bring about said radial movement of the knob at axial displacement of the sleeve.

12. The lever according to claim 11, wherein said sleeve is manually releasable.

13. The lever according to claim 1, wherein the knob is connected to the lever part so that the knob is locked against turning movements around its longitudinal shaft axis.

14. The lever according to any one of the claims 9 or 13, wherein the bushing is mounted on the lever part and has locking organs arranged to cooperate with corresponding locking organs in the knob for locking against turning thereof relative to the lever part.

* * * * *